Dec. 13, 1932.   O. G. ERICKSON   1,890,976
SLIDE VALVE FOR ENGINES
Filed Jan. 8, 1930   2 Sheets-Sheet 2

INVENTOR
Oscar G. Erickson
BY
ATTORNEY

Patented Dec. 13, 1932

1,890,976

UNITED STATES PATENT OFFICE

OSCAR G. ERICKSON, OF DETROIT, MICHIGAN

SLIDE VALVE FOR ENGINES

Application filed January 8, 1930. Serial No. 419,434.

This invention relates to an internal combustion engine and it has to do especially with a slide valve advantageously used with an internal combustion engine. The nature of the valve is that of a sliding tubular construction wherein the incoming gaseous fuel or outgoing exhaust gases pass partly through the tubular valve member, or in any event through an open tubular end, and suitable circumferentially disposed ports in the tubular wall, are provided for the passage of the gases through the same into or out of the combustion chamber.

The construction contemplates for the protection of the surface with which the tubular valve structure contacts in its sliding movement; that is to say, the in-flow or out-flow of the fuel or exhaust gases respectively is confined to such channels as to effectively prevent the flow from direct contact with the walls having frictional sliding engagement so that the walls will not be washed of lubricant. This obviously, goes a long way toward efficient operation of the valve.

The invention will be better understood by reference to the accompanying drawings wherein, Fig. 1 is a sectional view taken through an engine showing a valve structure constructed in accordance with the invention.

Figure 1:
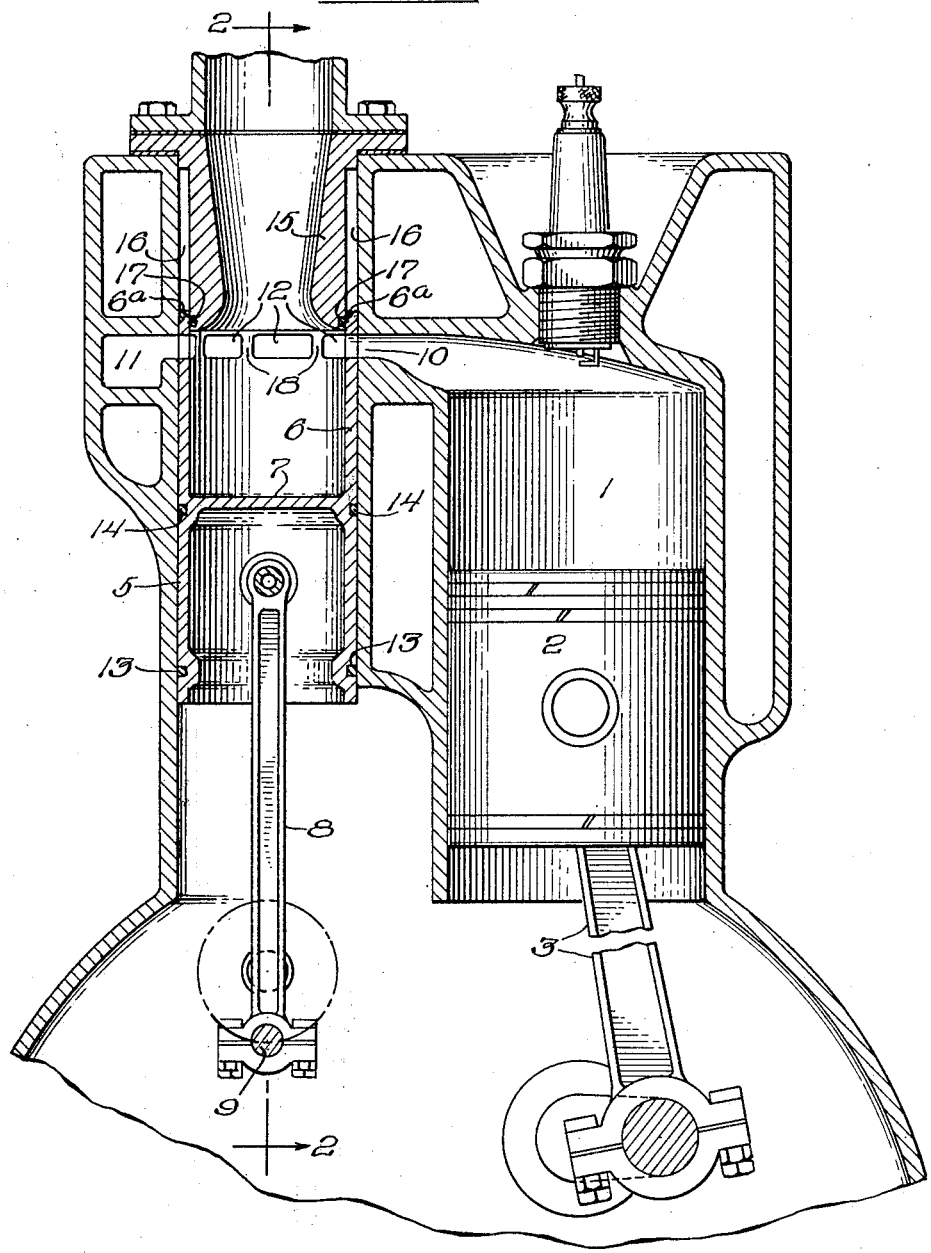

In the drawings, an engine block is shown having the usual cylinder 1, with piston 2 therein connected as by means of the connecting rod 3 to the usual crank shaft. Positioned adjacent the combustion cylinder is a cylindrical construction 5 in which is mounted the tubular valve. This valve is of cylindrical formation having cylindrical walls 6 and intermediate partition 7. The tubular valve is designed to be reciprocated in the cylindrical formation and for this purpose a connecting rod 8 may be employed which connects the tubular valve with a crank shaft 9. The cylinder 5 opens into the crank case so as to be lubricated by oil in the crank case.

A passageway 10 in the engine block connects with a chamber 11 which extends substantially around the cylinder 5. The valve has a number of ports or openings 12 circumferentially disposed as shown near its upper end, designed in the reciprocation of the valve, to come into alignment with the passageway 10 and chamber 11. The valve is preferably provided with sealing rings 13 and 14 and above the chamber 11 there is arranged an element 15 designed to cooperate with the walls of the cylinder 5 to form a circumferential chamber 16 in which the upper end of the cylindrical valve reciprocates. The fit between the upper end walls of the tubular valve and the passageway 16 is fairly close in order to give a nicety of action and for the purpose of providing an effective seal the member or plug 15 is equipped with a sealing ring 17 which contacts with the inner wall of the valve.

Only one valve structure need to be described. The one shown in Fig. 1 may be termed an intake valve. It is understood, of course, that there is an intake and exhaust valve for each combustion chamber as shown in Fig. 2 wherein the two valves are shown, the intake being the one referenced 6 and the exhaust 6a but the structures are similar. It is to be noted that the ports 12 are divided by spaced bars 18 which provide for the guiding of that portion of the valve past the port 10 and chamber 11.

Those skilled in the art will readily appreciate the manner of operation; suffice to say that the shaft 9 is driven at half speed relative to the crank shaft. During the intake stroke of the piston the intake valve is opened. At this time the crank 9 moves substantially from point $a$ to point $b$ of its cycle of movement and at its lower-most position the ports 12 are opened to their greatest extent and establish a good communication between the intake line and the combustion chamber to permit in-flow of fuel. In other words, during the intake stroke of the engine piston the engine crank moves through 180° while the crank 9 moves substantially 90° from $a$ to $b$. When the crank 9 reaches point $a$ the ports just begin to open, reach their side open position at the lower-most position of the crank intermediate points $a$ and $b$, and then start closing and become closed at about point $b$. Following this intake, as is well appreciated, the engine piston makes three more strokes known as the compression strokes, power stroke, and exhaust stroke, and at this time the crank 9 is moving in its upper portion of its cycle of movement from point $b$ around to point $a$; the intake valve is closed during all this period. The exhaust valve is similarly arranged but the cranks are disposed so that the exhaust valve is in its lowermost position during the exhaust stroke and closed during the intake, compression, and power stroke.

Figure 2:
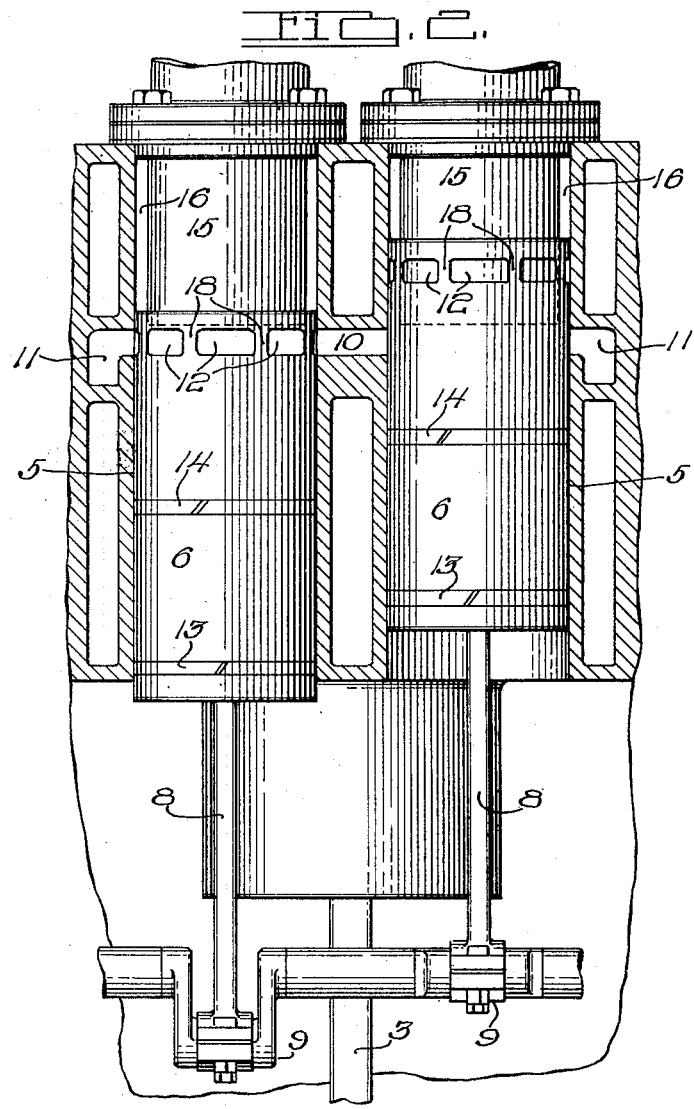
Fig. 2 is a sectional view taken substantially at right angles to the view shown in Fig. 1 illustrating an intake and exhaust valve.
Figure 3:
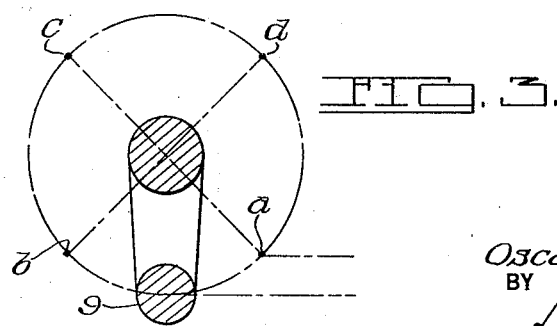
Fig. 3 is a diagrammatic view illustrating the positions in which the valve is open.

It will be noted by reference to Fig. 1 that the incoming gaseous fuel does not flow in direct contact with any surface subjected to sliding action in the movement of the valve save for the inner wall of the tubular valve member above the partition. The element or plug 15 protects the outer walls of the chamber 16 and the ring 17 forms a seal therefor. Below the port 10 the valve is always in contact with the walls of the cylinder so that incoming fuel has no access to these walls. The ring 14 is disposed preferably so that in the upper-most position of the tubular valve the ring lies below the port 10 thus serving as a seal.

The ring 17 is preferably a fairly strong ring and it may be relatively large, such rings being sometimes termed "bull rings". In order to facilitate assembly the upper inner edge portion of the tubular valve may be bevelled off as at $6a$. This bevelled portion will compress the ring 17 as the cylindrical member is urged into position during assembly operation. After assembly, and in normal operation, the bevel portion preferably does not come below any part of the ring 17.

I claim:

1. In an internal combustion engine, a valve structure comprising a cylinder with one end connecting into the engine crank case, a passageway directly connecting the cylinder to the engine combustion chamber, a conduit connecting into the opposite end of the cylinder, a tubular member in the cylinder into which the conduit connects, means for reciprocating the same, said tubular member having ports through its wall designed to establish communication with the passageway and conduit in a predetermined position of the tubular member, a partition located intermediate the ends of the tubular member which forms a closure and defines a closed passageway from the conduit to the combustion chamber, and a chamber substantially surrounding the cylinder and located in alignment with said ports when the ports establish communication with the passageway and conduit.

2. A valve structure for an engine comprising a cylinder opening into the engine crank case, a passageway connecting the cylinder with the engine combustion chamber, an open end tubular valve member in the cylinder having ports through its wall for connecting the passageway in predetermined valve position, means for reciprocating the tubular valve member, means projecting into the cylinder and slidably engaging the interior walls of the open end of the tubular valve, and a sealing ring carried by said means and engaging the interior wall of the tubular member, said tubular valve member having a partition intermediate its ends for defining the passageway connecting into the combustion chamber.

3. A valve structure for an internal combustion engine, comprising a cylinder opening into the engine crank case, passageway connecting the cylinder and the engine combustion chamber, a chamber substantially surrounding the cylinder and connected into the passageway, an open end tubular valve member reciprocable in the cylinder having ports through its walls for communication with the chamber and passageway in predetermined valve position, a conduit for conducting gaseous substance with the flow of gaseous substance passing through the interior portion of the open end tubular valve member and through its ports in said predetermined position, a partition carried by the valve member intermediate the ends of the valve member for closing the gaseous passageway, means extending into the cylinder but spaced from the walls therefrom, the open end of the tubular valve working in said space.

4. A valve structure comprising a cylinder, a tubular sleeve reciprocable therein, said cylinder and sleeve having ports adapted to align with each other substantially at one end of a reciprocable movement, a conduit leading into the cylinder and into the inside of the sleeve at one end, a partition in the tubular valve member which forms a closed end for confining the flow of gases or the like through the conduit and out the ports when aligned, fixed means projecting into the cylinder spaced from the walls thereof and engaging the inner face of the tubular valve, said valve in its reciprocable movement moving into the space defined by the cylinder walls and said last named means whereby the ports in the tubular valve member are positioned in said space and out of communication with ports in the cylinder, and a sealing ring carried by said means and engaging the interior walls of said cylindrical valve member.

5. In an internal combustion engine the combination of an engine block having a combustion cylinder and a valve cylinder, a crank case into which both of said cylinders communicate so as to be adapted to be similarly lubricated, a piston valve in the valve cylinder, means for reciprocating it, said valve cylinder having ports, a chamber substantially surrounding the valve cylinder and communicating with the combustion cylinder and parts, the piston valve being open-ended and provided with a closed partition intermediate its ends, said piston having ports through its wall adapted to communicate with the ports in the valve cylinder in predetermined piston position, and a conduit leading into the end of the valve cylinder and into the end of the piston valve.

6. In an internal combustion engine the combination of an angle block having a combustion cylinder and a valve cylinder, a crank case into which both of said cylinders communicate so as to be adapted to be similarly lubricated, a piston valve in the valve cylinder, means for reciprocating it, said valve cylinder having ports, a chamber substantially surrounding the valve cylinder and communicating with the combustion cylinder, the piston valve being open-ended and provided with a closed partition intermediate its ends, said piston having ports through its wall adapted to communicate with the ports in the valve cylinder in predetermined piston position, a member projecting into the cylinder at the end opposite the crank case, spaced from the walls thereof and fitting into the open end of the piston, said member being provided with a passageway for the flow of gases therethrough into the open end of the piston valve, and an expanding sealing ring carried by said member and sealing against the inner walls of the open-ended piston valve.

In testimony whereof I affix my signature.

OSCAR G. ERICKSON.